(12) United States Patent
Kurokawa

(10) Patent No.: US 9,329,673 B2
(45) Date of Patent: May 3, 2016

(54) INFORMATION PROCESSING DEVICE, INFORMATION PROCESSING METHOD, AND RECORDING MEDIUM

(75) Inventor: Takafumi Kurokawa, Osaka (JP)

(73) Assignee: NEC Solution Innovators, Ltd., Tokyo (JP)

( * ) Notice: Subject to any disclaimer, the term of this patent is extended or adjusted under 35 U.S.C. 154(b) by 21 days.

(21) Appl. No.: 14/112,280

(22) PCT Filed: Apr. 27, 2012

(86) PCT No.: PCT/JP2012/061470
§ 371 (c)(1),
(2), (4) Date: Oct. 17, 2013

(87) PCT Pub. No.: WO2012/147960
PCT Pub. Date: Nov. 1, 2012

(65) Prior Publication Data
US 2014/0043232 A1    Feb. 13, 2014

(30) Foreign Application Priority Data

Apr. 28, 2011  (JP) .................................. 2011-101894

(51) Int. Cl.
*G06F 3/01* (2006.01)
*G06F 3/00* (2006.01)
*G06F 3/03* (2006.01)

(52) U.S. Cl.
CPC ................ *G06F 3/005* (2013.01); *G06F 3/011* (2013.01); *G06F 3/017* (2013.01); *G06F 3/0304* (2013.01)

(58) Field of Classification Search
CPC ....................................... G06F 3/005

USPC .......................................................... 345/156
See application file for complete search history.

(56) References Cited

U.S. PATENT DOCUMENTS 8,564,534 B2 * 10/2013 Leyvand ................. A63F 13/06
345/156
2007/0228159 A1    10/2007 Kashiwa et al.
(Continued)

FOREIGN PATENT DOCUMENTS

| CN | 101901107 A | 12/2010 |
|---|---|---|
| CN | 101952818 A | 1/2011 |

(Continued)

OTHER PUBLICATIONS

International Search Report mailed on Jun. 26, 2012.
(Continued)

*Primary Examiner* — Amare Mengistu
*Assistant Examiner* — Joseph G Rodriguez
(74) *Attorney, Agent, or Firm* — Finnegan, Henderson, Farabow, Garrett & Dunner LLP

(57) ABSTRACT

An inputter inputs a captured image of a hand captured by a camera. An acquirer acquires information indicating the distance between the camera and the hand. A storer stores reference data for specifying a hand gesture and a command corresponding to the gesture, for each distance between the camera and the hand. A selector selects, from among the reference data stored in the storer, reference data corresponding to the distance indicated by the information acquired by the acquirer. A specifier refers to the reference data selected by the selector, specifies a hand gesture in the captured image input by the inputter, and specifies a command corresponding to the specified gesture.

18 Claims, 9 Drawing Sheets

(56) References Cited

U.S. PATENT DOCUMENTS

| | | | |
|---|---|---|---|
| 2009/0077504 A1* | 3/2009 | Bell et al. ............... | 715/863 |
| 2010/0251171 A1* | 9/2010 | Parulski ................. | 715/810 |
| 2010/0302281 A1 | 12/2010 | Kim | |
| 2011/0141009 A1 | 6/2011 | Izumi | |

FOREIGN PATENT DOCUMENTS

| | | |
|---|---|---|
| JP | 8-315154 | 11/1996 |
| JP | 9-185456 | 7/1997 |
| JP | 2001-216069 | 8/2001 |
| JP | 2002-083302 | 3/2002 |
| JP | 2002-196855 | 7/2002 |
| JP | 2003-131785 | 5/2003 |
| JP | 2004-078977 | 3/2004 |
| JP | 2004-356819 | 12/2004 |
| JP | 2005-031799 | 2/2005 |
| JP | 2005-190283 | 7/2005 |
| JP | 2006-99749 | 4/2006 |
| JP | 2008-146243 | 6/2008 |
| JP | 2010-257093 | 11/2010 |
| JP | 2011-054118 | 3/2011 |
| JP | 2011-192081 | 9/2011 |
| KR | 10-2007-0082562 | 8/2007 |
| KR | 10-2011-0008313 | 1/2011 |
| WO | WO 2005/003948 A1 | 1/2005 |
| WO | WO 2005/057921 A2 | 6/2005 |
| WO | WO 2009/035705 A1 | 3/2009 |

OTHER PUBLICATIONS

Extended European Search Report mailed on Sep. 19, 2014 by the European Patent Office in counterpart European Patent Application No. 12776429.8.

Notification of Reasons for Rejection mailed on Jun. 17, 2014 by the Japanese Patent Office in counterpart Japanese Patent Application No. 2013-512493.

Decision for Grant of Patent issued by the Korean Patent Office in counterpart Korean Patent Application No. 10-2013-7027930 dated Mar. 19, 2015.

Office Action issued by the Chinese Patent Office in counterpart Chinese Patent Application No. 201280020559.X dated Sep. 22, 2015.

* cited by examiner

INFORMATION PROCESSING DEVICE, INFORMATION PROCESSING METHOD, AND RECORDING MEDIUM

CROSS REFERENCE TO RELATED PATENT APPLICATION

This application is a National Stage Entry of International Application No. PCT/JP2012/061470, filed Apr. 27, 2012, which claims priority from Japanese Patent Application No. 2011-101894, filed Apr. 28, 2011. The entire contents of the above-referenced applications are expressly incorporated herein by reference.

TECHNICAL FIELD

The present invention relates to an information processing device, an information processing method, and a recording medium.

BACKGROUND ART

Information processing devices that capture a user by means of a camera, and input an operation command by means of a captured user's gesture are proposed.

For example, Patent Literature 1 discloses an interface device that obtains the outline of a user's hand in a captured image, and moves a cursor to a virtual switch on a display and selects the virtual switch, in accordance with the movement and change in shape of the hand.

Patent Literature 2 discloses an information processing device that recognizes the shape of a user's hand from a captured image, and displays a menu of a plurality of executable functions when a first shape is recognized. The information processing device selects an executable function in accordance with the position of the shape recognized in the image, and executes a selected function when a second shape is recognized.

Furthermore, Patent Literature 3 discloses an information processing device that masks a part of an image of the palm of a user's hand captured by a camera, detects movement of the palm of the hand by means of the masked image, and recognizes a command corresponding to movement of the hand.

CITATION LIST

Patent Literature

Patent Literature 1: Unexamined Japanese Patent Application Kokai Publication No. 2004-78977
Patent Literature 2: Unexamined Japanese Patent Application Kokai Publication No. 2008-146243
Patent Literature 3: Unexamined Japanese Patent Application Kokai Publication No. 2002-83302

SUMMARY OF INVENTION

Technical Problem

All of the information processing devices disclosed in the Patent Literatures 1 to 3 capture an image of a user's hand, extracts an image of the hand from the captured image, and in addition, recognizes the movement or shape of the hand. However, extracting an image of a user's hand and also recognizing the movement or shape of the hand are not easy. For example, as the distance between the user and the camera becomes further, the image of the hand becomes smaller, the time for extraction processing takes longer, and also the recognition rate becomes declined. Therefore, inputting a suitable operation command becomes difficult.

The present invention takes the aforementioned circumstances into account, and an objective thereof is to provide an information processing device, an information processing method, and a recording medium, which make it possible for more suitable data to be input on the basis of the state of a captured subject.

Solution to Problem

An information processing device according to a first aspect of the present invention comprises:
an inputter that inputs a captured image of a subject captured by a camera;
an acquirer that acquires information indicating a distance between the camera and the subject;
a storer that stores reference data for specifying a state of the subject and input data corresponding to the state, for each distance between the camera and the subject;
a selector that selects, from among the reference data stored in the storer, reference data. corresponding to the distance indicated by the information acquired by the acquirer; and
a specifier that refers to the reference data selected by the selector, specifies the state of the subject in the captured image input by the inputter, and specifies data corresponding to the specified state.

An information processing method according to a second aspect of the present invention comprises:
a storing step for storing reference data for specifying a state of a subject captured by a camera and input data corresponding to the state, for each distance between the camera and the subject;
an inputting step for inputting a captured image of the subject captured by the camera;
an acquiring step for acquiring information indicating a distance between the camera and the subject;
a selecting step for selecting, from among the reference data stored in the storing step, reference data corresponding to the distance indicated by the information acquired in the acquiring step; and
a specifying step for referring to the reference data selected in the selecting step, specifying the state of the subject in the captured image input in the inputting step, and specifying data corresponding to the specified state.

A program recorded on a recording medium according to a third aspect of the present invention causes a computer to function as:
an inputter that inputs a captured image of a subject captured by a camera;
an acquirer that acquires information indicating a distance between the camera and the subject;
a storer that stores reference data for specifying a state of the subject and input data corresponding to the state for each distance between the camera and the subject;
a selector that selects, from among the reference data stored in the storer, reference data corresponding to the distance indicated by the information acquired by the acquirer; and
a specifier that refers to the reference data selected by the selector, specifies the state of the subject in the captured image input by the inputter, and specifies data corresponding to the specified state.

Advantageous Effects of Invention

According to the present invention, it is possible for more suitable data to be input on the basis of the state of a captured subject.

DESCRIPTION OF EMBODIMENTS

Figure 1:
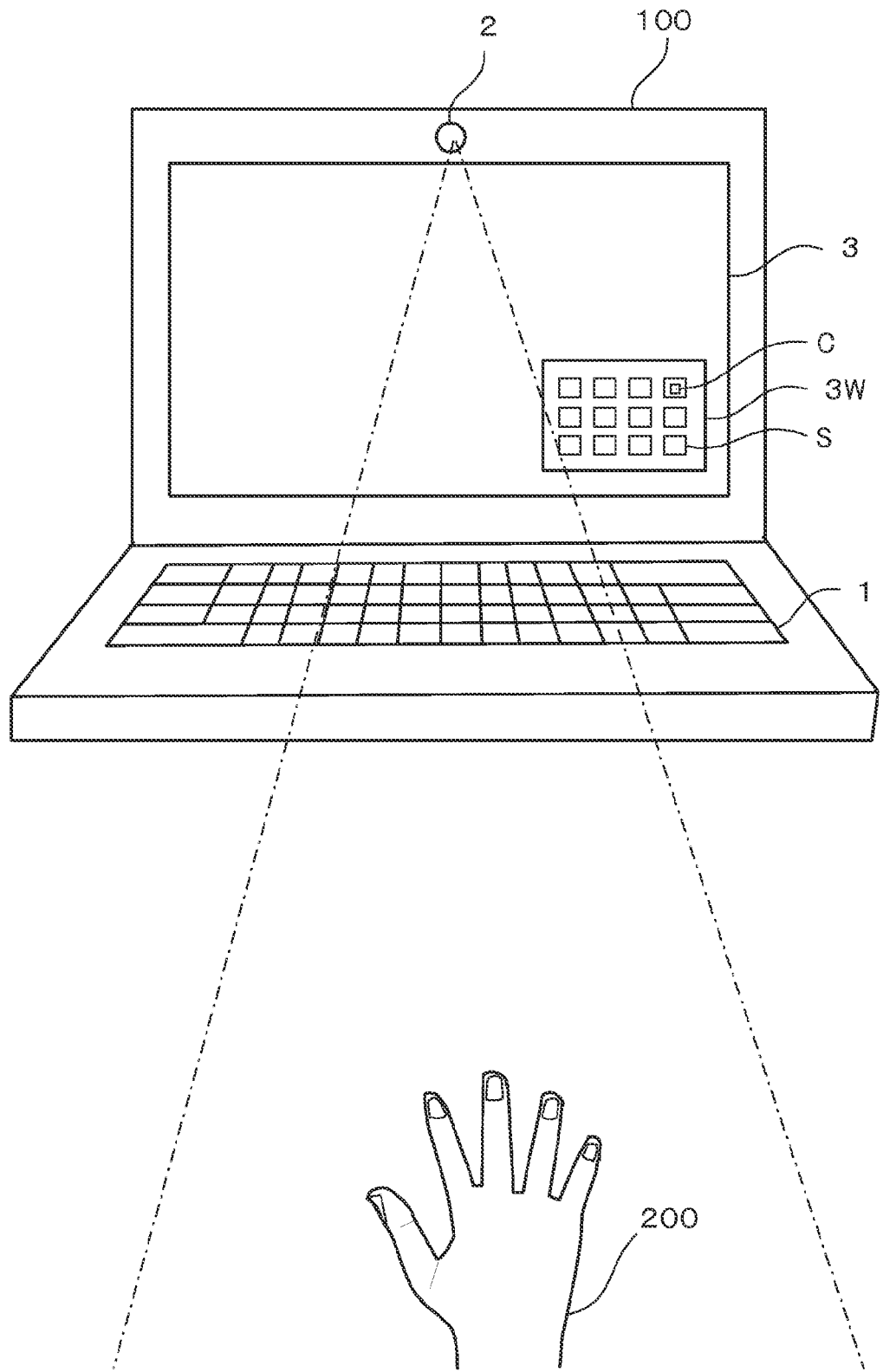
FIG. 1 is a perspective view of an information processing device according to an embodiment of the present invention.

An information processing device according to an embodiment of the present invention is hereafter described with reference to the drawings. It should be noted that the same reference signs are appended to the same or corresponding portions in the drawings.

An information processing device 100 according to the present embodiment is provided with a gesture input function that specifies a gesture (state) that appears in the movement, shape, inclination and the like of a hand 200 serving as a subject, and inputs input data such as a command corresponding to the specified gesture. As depicted in FIG. 1, the information processing device 100 is provided with an operator 1, a camera 2 serving as an image capturer, and a display 3.

The information processing device 100 is a commonly used computer. The information processing device 100 processes input data corresponding to the gesture of the hand 200 and data input by the operation of the operator 1.

The operator 1 is provided with a keyboard, a mouse, and the like. The operator 1 inputs, to the information processing device 100, data corresponding to operational input of the user.

The camera 2 is provided with imaging elements such as a CCD (charge-coupled device) or CMOS (complementary metal-oxide semiconductor) sensor. The camera 2, for example, captures an image of the hand 200 of the user for the information processing device 100, as a subject positioned within the field of vision. The user inputs various data by moving the hand 200 and altering the shape of the hand 200, within the field of vision of the camera 2.

The display 3 is provided with a LCD (liquid crystal display) or the like. The display 3 displays an image relating to an application being executed by the information processing device 100. Furthermore, the display 3 displays a gesture input support window 3W constantly or in response to a predetermined operation. Selection targets S such as menu items, files, or icons, and a selection cursor C are displayed in the gesture input support window 3W.

Figure 2:
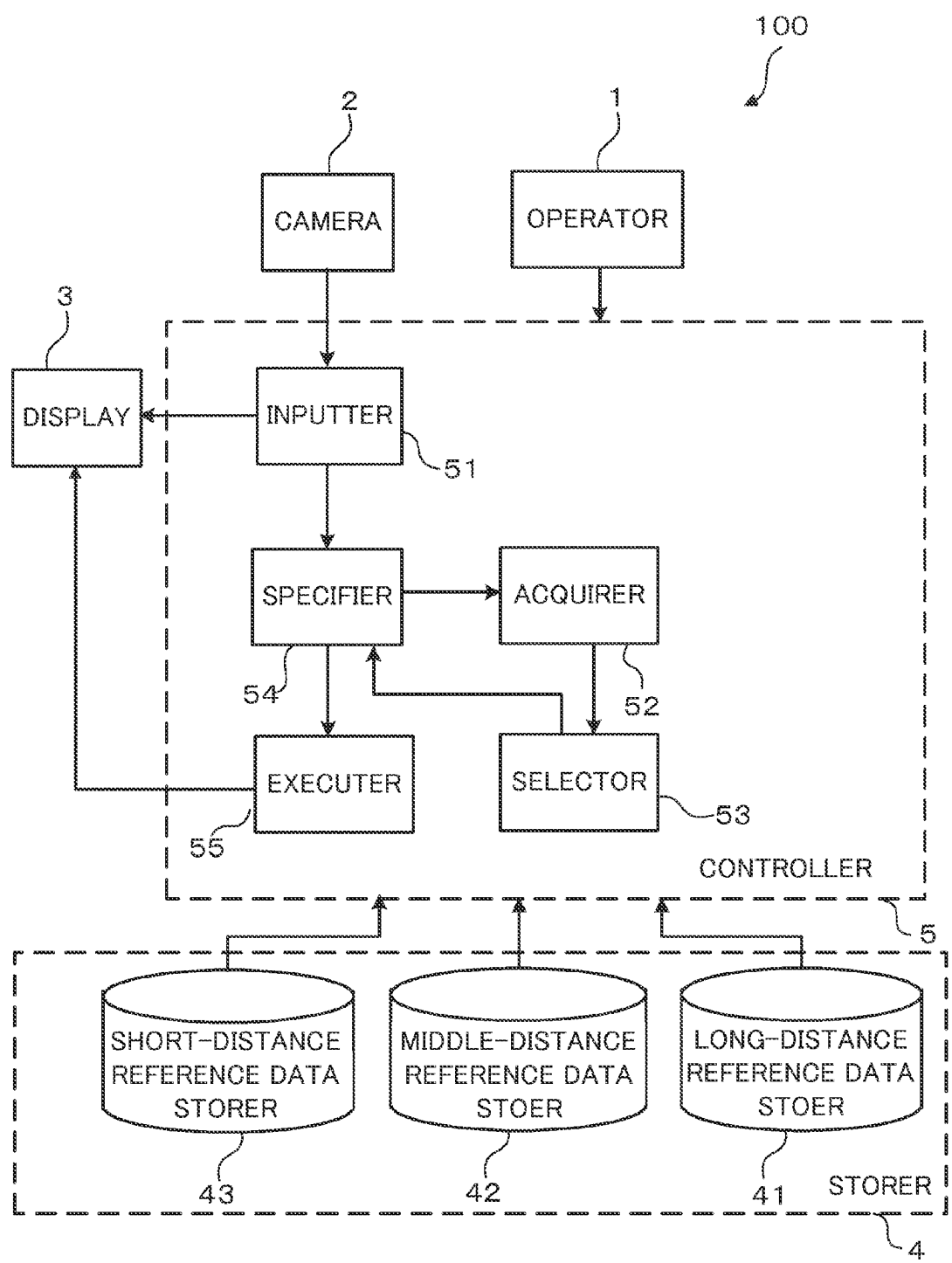
FIG. 2 is a functional block diagram of the information processing device of FIG. 1.

FIG. 2 depicts a functional configuration of the information processing device 100. The information processing device 100 is provided with a storer 4 and a controller 5 as well as the operator 1, the camera 2, and the display 3.

The storer 4 is provided with a storage device or the like such as a RAM (random-access memory) or a hard disk. The storer 4 stores various types of data. For example, the storer 4 stores reference data for specifying a user's gesture by the hand 200 and input data corresponding to the gesture, for each distance between the camera 2 and the hand 200. For this reason, the storer 4 is provided with a long-distance reference data storer 41, a middle-distance reference data storer 42, and a short-distance reference data storer 43. The reference data is data for specifying a gesture (also referred to as a hand gesture operation pattern) expressed by the movement, shape, inclination and the like of the hand 200, such as those depicted in FIG. 3 to FIG. 5.

The long-distance reference data storer 41 stores reference data specifying a user's simple gesture by the hand 200 that is able to be specified even from a long distance. The long-distance reference data storer 41, for example, stores reference data for specifying the shape of the hand 200 and the leftward, rightward, upward, and downward movements of the hand 200 as exemplified in FIG. 3. The reference data for specifying the shape of the hand 200 is, for example, pattern data or the like for which the shape of the hand is converted to data. The reference data for specifying the leftward, rightward, upward, and downward movements of the hand 200 is, for example, data relating to the amount of movement of the hand's center of gravity per unit time, or pattern data, which is converted data of the locus with respect to the center of gravity when the hand is moved, or the like. The reference data stored in the long-distance reference data storer 41 is used for specifying a user's gesture by the hand 200, in the case where the distance between the camera 2 and the hand 200 is far apart and the region of the hand 200 in the image data is small.

Figure 4A:
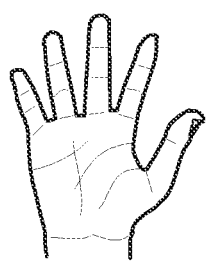
FIGS. 4A, 4B, 4C, and 4D are drawings depicting examples of hand shapes as middle-distance gestures.
Figure 4B:
Figure 4C:
Figure 4D:
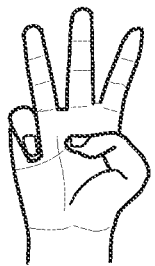
Figure 5A:
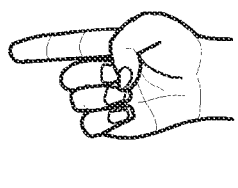
FIGS. 5A, 5B, 5C, and 5D are drawings depicting examples of hand inclinations as short-distance gestures.
Figure 5B:
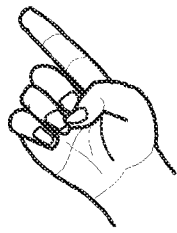
Figure 5C:
Figure 5D:
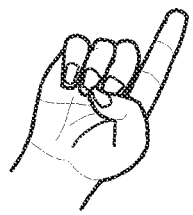

The middle-distance reference data storer 42 stores reference data for specifying a user's gesture by the hand 200 that is relatively difficult to specify. The middle-distance reference data storer 42, for example, stores reference data for specifying shapes of the hand 200, such as those exemplified in FIG. 4A to FIG. 4D. FIG. 4A is a shape of a hand in which all fingers are extended. FIG. 4B is a shape of a hand in which the index finger is extended and the remaining fingers are bent. FIG. 4C is a shape of a hand in which the index finger and the middle finger are extended and the remaining fingers are bent. FIG. 4D is a shape of a hand in which the index finger, the middle finger, and the third finger are extended and the remaining fingers are bent.

The short-distance reference data storer 43 stores reference data for specifying a user's gesture by the hand 200 that is even more relatively difficult to specify. The short-distance reference data storer 43, for example, stores reference data for specifying shapes of the hand 200, such as those exemplified in FIG. 5A to FIG. 5D. FIG. 5A to FIG. 5D are examples in which the shapes of the hand itself are all the same but the inclinations of the hand 200 are different. The reference data stored in the short-distance reference data storer 43 is used for specifying a gesture by the hand 200, in the case where the distance between the camera 2 and the hand 200 is close and the hand 200 in the image data is large.

It should be noted that the middle-distance reference data storer 42 also stores reference data that is stored by the long-distance reference data storer 41. Furthermore, the short-distance reference data storer 43 also stores reference data that is stored by the long-distance reference data storer 41 and reference data that is stored by the middle-distance reference data storer 42. In other words, the reference data is ranked in accordance with the difficulty of specifying the hand gestures, and if the short-distance reference data storer 43 is taken as having the top rank and the long-distance reference data storer 41 is taken as having the bottom rank, top-rank reference data includes bottom-rank reference data. In this way, the storer 4 stores reference data for specifying a larger number of gestures as the distance between the camera 2 and the hand 200 becomes closer.

Furthermore, the storer 4 stores input data associated with a user's gesture by the hand 200, for each distance between the camera 2 and the hand 200. It is arbitrary as to what kinds of data are associated with a user's gesture by the hand 200.

Figure 3:
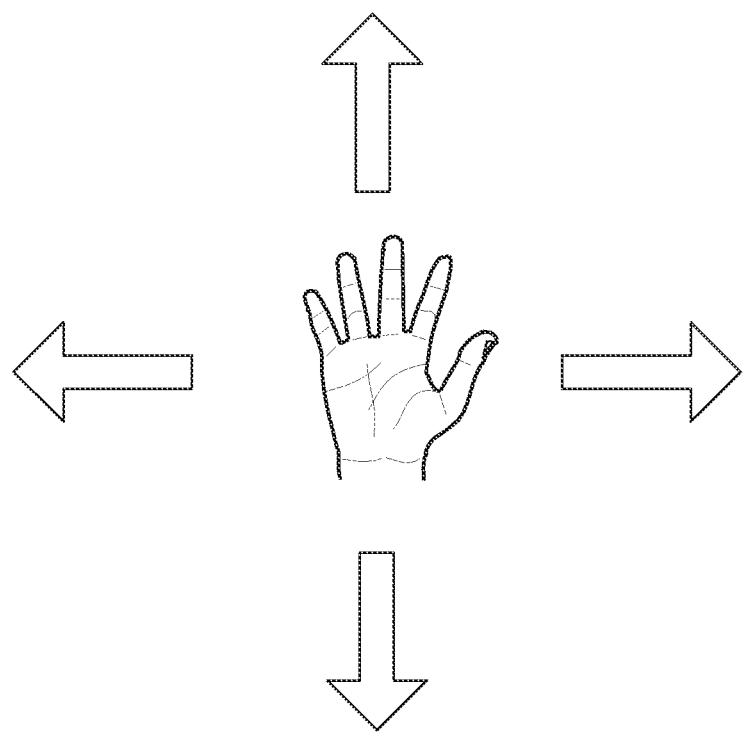
FIG. 3 is a drawing depicting an example of hand movements as long-distance gestures.

For example, the long-distance reference data storer 41 associates and stores the direction of the movement of the hand 200 depicted in FIG. 3 specified by stored reference data, and a command for moving the cursor C within the gesture input support window 3W in the direction.

For example, the middle-distance reference data storer 42 associates and stores the number of extended fingers of the hand 200 depicted in FIG. 4A to FIG. 4D specified by the stored reference data with a command for designating a menu number that matches the number of fingers within the gesture input support window 3W. Besides this, it is permissible for the middle-distance reference data storer 42 to associate and store the number of extended fingers of the hand 200, and a command for inputting numerical data that matches the number of fingers.

For example, the short-distance reference data storer 43 associates and stores the shape of the hand 200 depicted in FIG. 5A to FIG. 5D specified by stored reference data with a command for scrolling an image within the gesture input support window 3W in the direction indicated by the index finger in that shape. Besides this, it is permissible for the short-distance reference data storer 43 to associate and store the shape of the hand 200 with a command such as for moving a cursor in the direction indicated by the index finger in the shape.

The controller 5 is provided with a processor (processing unit) or the like. The processor has an auxiliary storage device such as a flash memory, an EEPROM (electrically erasable programmable read-only memory), or a hard disk device, and has RAM or the like that is working memory. The processor, in accordance with a program stored in the EEPROM, temporarily stores image data and other data in the RAM, and executes an information processing algorithm.

The controller 5 is provided with an inputter 51, an acquirer 52, a selector 53, a specifier 54, and an executer 55. The controller 5 operates in accordance with a program stored in the storer 4, and executes a variety of processing in accordance with input data such as a command input by a user.

The inputter 51 inputs a captured image of the hand 200 captured by the camera 2. The inputter 51 converts an analog signal of the captured image into a digital signal and generates image data on a frame-by-frame basis. The inputter 51 outputs the image data on a frame-by-frame basis to the display 3 and displays this image data as a live view image.

Figure 6:
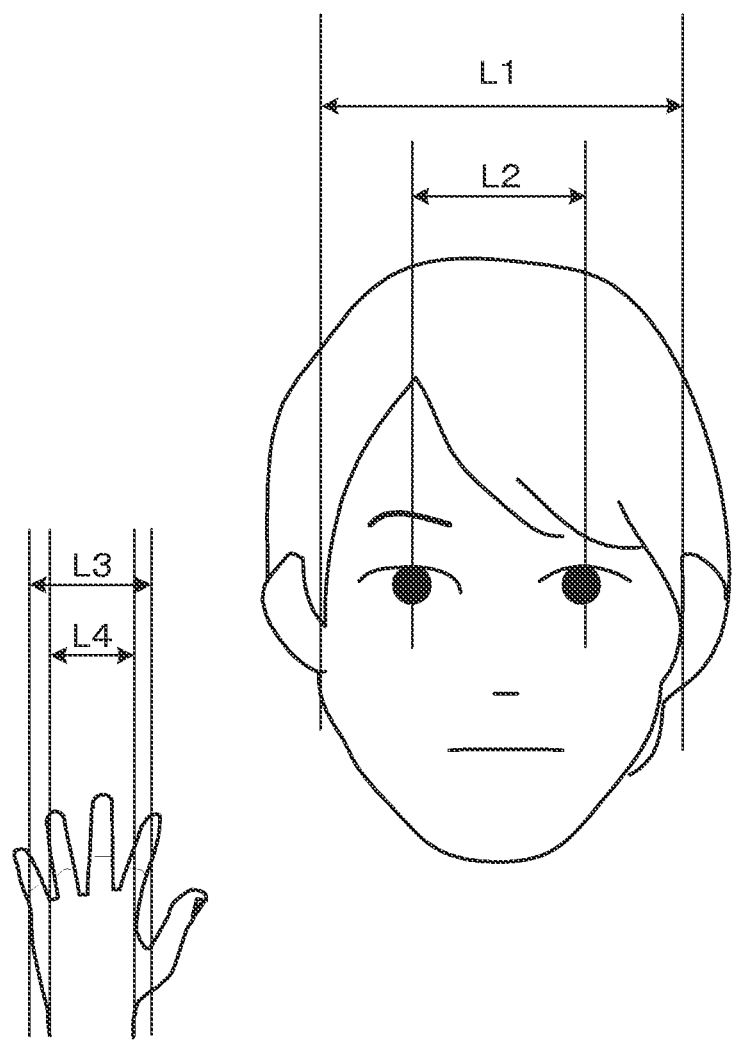
FIG. 6 is a drawing for illustrating a method for acquiring information indicating the distance between a camera and a user.

The acquirer 52 acquires information indicating the distance between the camera 2 (image capturer) and the hand 200. The acquirer 52 analyzes image data captured by the camera 2 and acquires the information indicating the distance between the camera 2 and the hand 200. The acquirer 52 acquires the length L1 between the temples in a captured user face region, the length L2 of the distance between the eyes, the width L3 of the back of the hand 200, or the width L4 of the wrist (hereafter, referred to as the temple length L1 or the like), such as those depicted in FIG. 6, as information indicating the distance between the camera 2 and the hand 200. For example, the acquirer 52 acquires the temple length L1 or the like from image analysis data generated by the specifier 54 that is described later. The temple length L1 or the like correlates with the distance between the camera 2 and the user without being much affected by individual differences. Therefore, it is able to be said that the shorter the distance between the camera 2 and the hand 200 becomes, the shorter the temple length L1 or the like becomes.

The selector 53 selects reference data corresponding to the distances indicated by L1 or the like acquired by the acquirer 52. The selector 53 detects the distance D between the camera 2 and the hand 200 of the user on the basis of L1 or the like acquired by the acquirer 52. For example, in the detection of the distance D, first, the selector 53 obtains the distance between the camera 2 and the user by substituting L1 or the like into a relational expression of these distances and the distance between the camera 2 and the user. Because the distance between the camera 2 and the user approximately matches the distance D between the camera 2 and the hand 200, the selector 53 detects the obtained distance as the distance D between the camera 2 and the hand 200.

For example, if the detected distance D is equal to or less than a reference value D1, the selector 53 selects reference data stored in the short-distance reference data storer 43. If the distance D is greater than the reference value D1 and equal to or less than a reference value D2, the selector 53 selects reference data stored in the middle-distance reference data storer 42. If the distance D is greater than the reference value D2, the selector 53 selects reference data stored in the long-distance reference data storer 41.

The specifier 54 refers to the reference data selected by the selector 53, specifies a user's gesture by the hand 200 in the captured image input to the inputter 51, and specifies input data corresponding to the specified gesture. In specifying the user's gesture by the hand 200, for example, the specifier 54 extracts the hand 200 from image data on a frame-by-frame basis generated by the inputter 51 and generates image analysis data.

Here, the generation of image analysis data will be described in detail. The specifier 54 is provided with a memory that stores image data of a plurality of frames. The specifier 54 obtains a difference image of an image of the current captured frame and an image of the preceding captured frame. In addition, the specifier 54 binarizes the difference image obtained, and if the eight neighboring pixel values surrounding each white pixel in the binarized image are greater than a preset threshold value, the specifier 54 expands the white pixel region. By doing this, the specifier 54 executes expansion processing for connecting and expanding white regions. Furthermore, if the eight neighboring pixel values surrounding each black pixel in the binarized image are less than the preset threshold value, the specifier 54 reduces the black pixel region. By doing this, reduction processing for removing black dots that constitute noise is executed. In this way, the specifier 54 generates image analysis data by extracting, from the image data, an image of the hand 200 as an object having movement.

Furthermore, it is permissible for the specifier 54 to use the above-described difference image so as to include, in the image analysis data, data relating to the amount of movement per unit time of the center of gravity of the hand 200, or pattern data which is converted data of the locus with respect to the center of gravity When the hand 200 is moved, or the like. Image analysis data generated in this way is used in the acquisition of information indicating the distance between the camera 2 and the user by the acquirer 52. It should be noted that it is permissible for the specifier 54 to extract an image of the hand 200 by analyzing skin-color degree information or brightness information or the like with respect to the image data, and generate image analysis data.

The specifier 54 extracts an image of the hand 200 in the captured image that is input by the inputter 51, and on the basis of the reference data selected by the selector 53, specifies a user's gesture by the hand 200 depicted by the extracted image of the hand 200. More specifically, the specifier 54 extracts data corresponding to the hand 200 from the generated image analysis data, and compares the extracted data with the reference data selected by the selector 53. If a user's gesture by the hand 200 included in the image analysis data matches the reference data, the specifier 54 specifies the gesture of the hand 200 corresponding to the matching reference data. The specifier 54 reads out input data associated with the specified gesture from the storer 4, and inputs the input data to the executer 55.

The executer 55 executes processing corresponding to the input data associated with the user's gesture by the hand 200 specified by the specifier 54. For example, the executer 55 refers to the long-distance reference data storer 41, the middle-distance reference data storer 42, and the short-distance reference data storer 43, and executes a command associated with the gesture of the hand 200 specified by the specifier 54. For example, in the case of a command for moving the cursor C, the executer 55 outputs a movement command for cursor C to the display 3. Thus, the cursor C within the gesture input support window 3W of the display 3 moves.

Next, the flow of input processing by the information processing device 100 will be described. The information processing device 100 is able to execute a variety of application software. In order to input to an application software, the information processing device 100, as described hereafter, performs input processing in the case where a user carries out input by means of a gesture, in addition to input processing from the operator 1.

Figure 7:
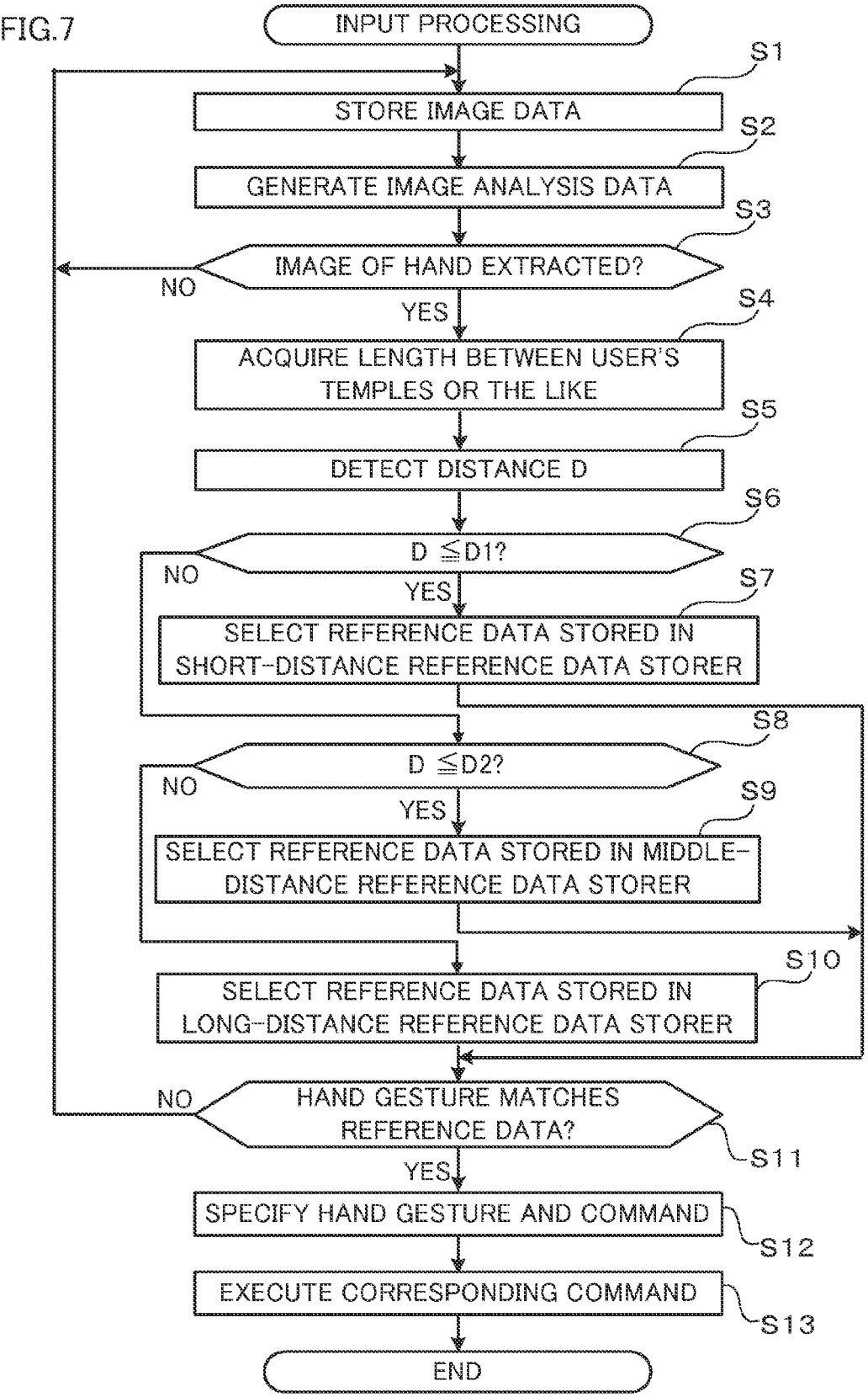
FIG. 7 is a flowchart for illustrating input processing in the embodiment.

The controller 5 executes input processing depicted in FIG. 7 in, for example, a time-divided manner. It should be noted that it is permissible for the controller 5 to display the gesture input support window 3W along with the start of the input processing, or to switch between display and non-display of the gesture input support window 3W by means of a gesture or input from the operator 1.

When input processing is started, first, the specifier 54 stores image data of a frame output from the inputter 51 (step S1).

Next, the specifier 54 generates image analysis data (step S2). If an image of the hand 200 is not extracted upon analysis of the image analysis data (step S3: NO), the controller 5 returns to step S1. On the other hand, if an image of the hand 200 is extracted upon analysis of the image analysis data (step S3: YES), the acquirer 52 acquires the temple length L1 or the like (step S4). Next, the selector 53 detects the distance D on the basis of the temple length L1 or the like (step S5).

If the detected distance D is equal to or less than the reference value D1 (step S6: YES), the selector 53 selects reference data stored in the short-distance reference data storer 43 (step S7).

If the detected distance D is greater than the reference value D1 (step S6: NO), and the detected distance D is equal to or less than the reference value D2 (step S8: YES), the selector 53 selects reference data stored in the middle-distance reference data storer 42 (step S9)

If the detected distance D is greater than D2 (step S8: NO), the selector 53 selects reference data stored in the long-distance reference data storer 41 (step S10).

When reference data is selected by the selector 53, the specifier 54 compares the generated image analysis data with the reference data selected by the selector 53, and determines whether or not the gesture of the hand 200 matches the reference data (step S11).

If the gesture of the hand 200 does not match the reference data (step S11: NO), the controller 5 returns to step S1. On the other hand, if the gesture of the hand 200 matches the reference data (step S11: YES), the specifier 54 specifies the gesture of the hand 200 and a command associated with the specified gesture (step S12).

Next, the executer 55 executes the command associated with the gesture of the hand 200 specified by the specifier 54 (step S13). Then, the controller 5 terminates the input processing.

According to the present embodiment as described above in detail, reference data for specifying a user's gesture by the hand 200 is selected in accordance with the distance between the camera 2 and the hand 200. Thus, because a user's gesture by the hand 200 that is specifiable at the distance between the camera 2 and the hand 200 is specified, it is possible for more suitable data to be input on the basis of the user's gesture by the hand 200 captured by the camera 2.

Furthermore, in the above-described embodiment, the storer 4 is configured so as to store reference data for specifying a larger number of gestures as the distance between the camera 2 and the hand 200 becomes closer. By doing this, in the case where the distance between the camera 2 and the hand 200 is close, it is possible for input data of a wide variety of commands or the like to be input since a larger number of gestures are able to be specified.

In the case where the camera 2 and the hand 200 are positioned at a middle distance, although the number of specifiable user's gestures by the hand 200 decreases compared to the case of a short distance, it is possible to reduce the processing load and erroneous specifying because the reference patterns of unspecifiable gestures and image analysis data are not compared to each other.

In the case where the distance between the camera 2 and the hand 200 is far apart, although the number of specifiable user's gestures by the hand 200 further decreases compared to the cases of a short distance and a middle distance, it is possible to further reduce the processing load and erroneous specifying because the reference patterns of unspecifiable gestures and image analysis data are not compared to each other. Furthermore, because reference patterns of specifiable gestures and image analysis data are compared even in the case where the distance between the camera 2 and the hand 200 is far apart, it is possible for input data associated with a user gesture by the hand 200 to be input reliably.

It should be noted that, in the above-described embodiment, the storer 4 is configured so as to store reference data for specifying, as astute, the movement, shape, and inclination of the hand 200 serving as a subject. Thus, it is possible for the user to input data of a large number of categories because it is possible for data to be input by means of the movement (hand gesture) of the hand 200 that is able to express a variety of gestures.

Furthermore, in the above-described embodiment, an image of the hand 200 in a captured image input by the inputter 51 is extracted, and a user's gesture by the hand 200 depicted by the extracted image of the hand 200 is specified on the basis of reference data selected by the selector 53. By doing this, it is possible for the information processing device 100 to specify a user's gesture in real time, and input data in a prompt manner.

Furthermore, in the above-described embodiment, the acquirer 52 is configured so as to analyze image data captured by the camera 2 and acquire information indicating the distance between the camera 2 and the user. Thus, it is possible for the device configuration to be implemented in a simple manner compared to the case where an optical sensor or the like is used.

Figure 8:
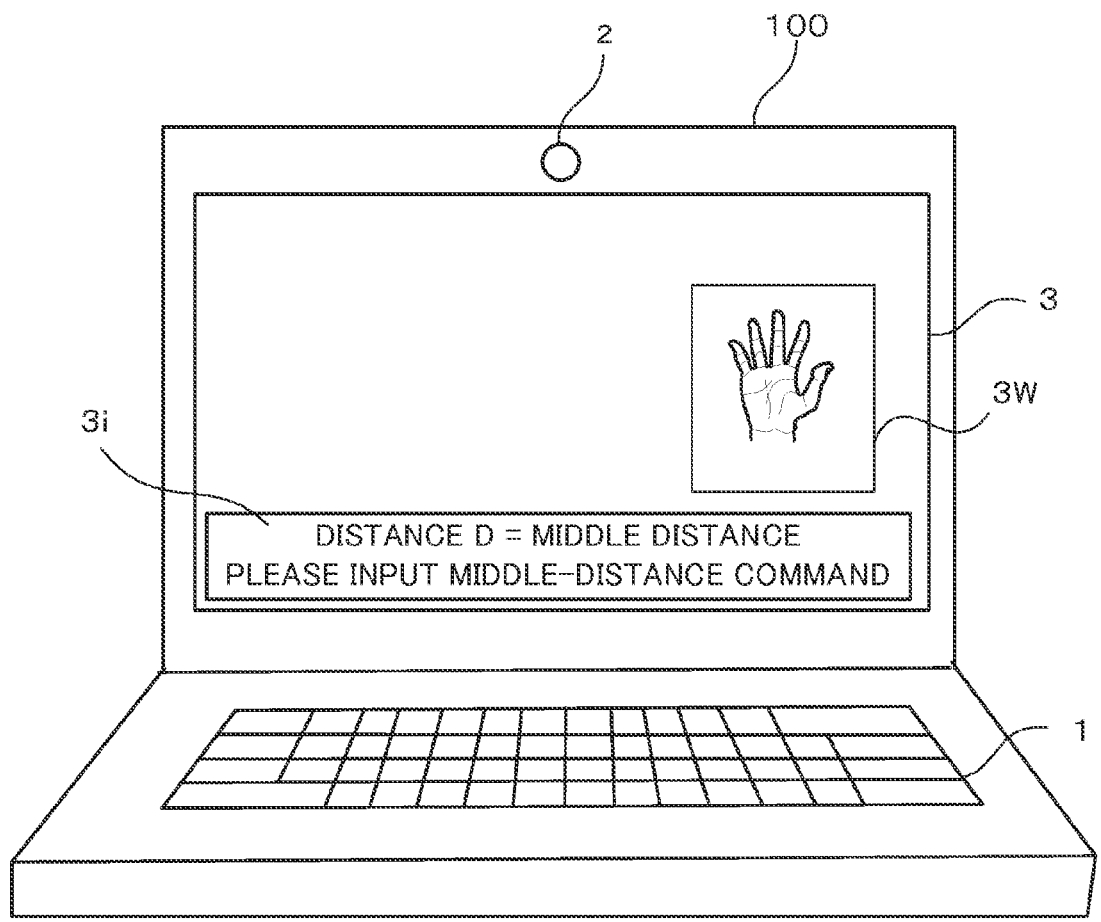
FIG. 8 is a drawing depicting an exemplary display of an image of a hand and a message, on a display.

Furthermore, it is permissible for the display 3 to be configured so as to display an image corresponding to the image data captured by the camera 2. In this case, for example, as depicted in FIG. 8, an image of the hand 200 extracted from the image data is displayed in the gesture input support window 3W. By doing this, it is possible for the user to carry out operational input while confirming the gesture of the hand 200 to input data more reliably. In addition, it is permissible for the display 3 to display, in a window 3i, the detected distance D and a message reporting the types of commands that are able to be specified at the distance. Thus, the user is able to know what kinds of commands are able to be input by means of a gesture.

Figure 9:
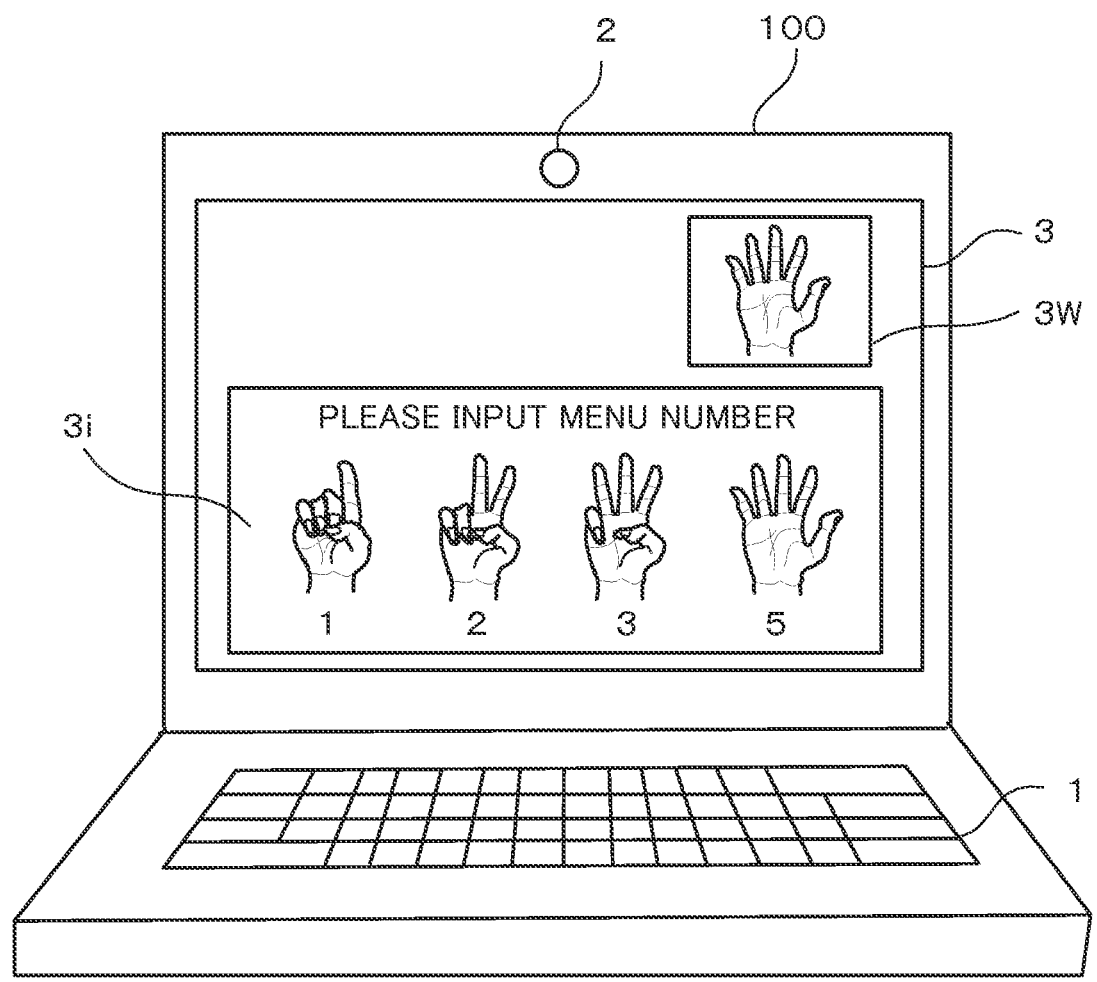
FIG. 9 is a drawing depicting an exemplary display of an image of a hand and specifiable gestures on a display.

Furthermore, it is permissible for the display 3 to be configured so as to display a gesture of the hand 200 specified on the basis of reference data selected by the selector 53, and a command or the like associated with the gesture of the hand 200. For example, as depicted in FIG. 9, the display 3 displays the gesture input support window 3W that displays an image of the hand 200. In addition, the display 3 displays, in the window 3i, gestures of the hand 200 that correspond to reference data stored in the middle-distance reference data storer 42 and are able to be specified at the current distance between the hand 200 and the camera 2, and displays a command specifying a menu number that is input when the gesture is specified. Thus, it is possible for the user to know the gestures by the hand 200 that are able to be specified and what kinds of commands are able to be input with respect to those gestures.

It should be noted that, in the present embodiment, an example has been given in which information indicating the distance between the camera 2 and the user is obtained from image data; however, it is permissible, for example, for the acquirer 52 to be configured on as to be provided with an infrared-light emitter, and to acquire information indicating the distance between the camera 2 and the user by means of reflection light in which infrared rays emitted from the infrared-light emitter are reflected by the hand 200. Furthermore, it is permissible for a plurality of cameras to be arranged, and for the acquirer 52 to be configured so as to acquire stereoscopic images from the plurality of cameras to obtain information indicating the distance between the camera 2 and the user on the basis of a parallax. It is also permissible for the acquirer 52 to use various types of sensors such as an optical sensor for the acquisition of information indicating the distance between the camera 2 and the user.

Furthermore, it is permissible for the information processing device 100 to use an infrared camera or the like as the camera 2 to capture an image of the hand 200. Still further, it is permissible for the information processing device 100 to use, for example, a depth sensor or the like to capture an image of the hand 200, without being restricted to an optical camera or an infrared camera or the like.

It should be noted that, in the present embodiment, the distance between the camera 2 and the hand 200 is divided into three stages; however, it is permissible for this distance to be divided into two stages, or to be divided into four or more stages.

Furthermore, the user's gestures that appear in the movement, shape, inclination and the like of a hand 200 depicted in FIG. 3 to FIG. 5 are examples, and are not restricted to these examples. For example, it is permissible for the specifier 54 to specify gestures by left hand or right hand, and to specify gestures using both hands.

Furthermore, gestures that accompany high-speed movements are difficult to specify at along distance compared to gestures with no movement. Therefore, for example, it is permissible for the specifier 54 to be configured so as to specify the shape of the hand only at the state where the hand is stationary when the distance D between the camera 2 and the hand 200 is farther than a predetermined distance. In this regard, it is permissible for the specifier 54 to be configured so as to specify a gesture that combines the shape and movement of the hand 200 when the distance D is closer than the predetermined distance.

Furthermore, an example has been given in which input is carried out by means of a gesture by the hand 200 in the present embodiment; however, for example, it is permissible for the information processing device 100 to be configured so as to be able to capture an image of the eyes, mouth, eyelids, tongue and the like, and to carry out input on the basis of a gesture or state (for example, relative position, movement, direction, degree of opening, degree of closing, and the like) implemented thereby.

It should be noted that, although the storer 4 stores reference data for each distance in the present embodiment, the present invention is not restricted to this. For example, it is permissible for the storer 4 to store reference data by appending identifiers to each reference data for identifying all distances, short distances, middle distances, and long distances. In this case, in accordance with the distance D detected by the selector 53, it is permissible for reference data having an identifier corresponding to the distance appended thereto to be read out, and to be determined whether or not the reference data matches the gesture of the hand 200 included in the image analysis data.

Furthermore, although the information processing device 100 and the camera 2 are configured as a single unit in the present embodiment, it is also possible for the camera 2 to be arranged independently from the information processing device 100, for example. In this case, the user carries out operational input implemented by a gesture of the hand 200 to the information processing device 100, by means of the camera 2 transmitting image data to the information processing device 100 via a communication network. By doing this, the user is able to input suitable data even in a remote operation specification such as when the camera 2 is placed away from a main body of the information processing device 100.

It is permissible for the information processing device 100 of the present embodiment to be implemented by means of a dedicated system, or by means of a normal computer system. For example, it is permissible to store and distribute a program for executing the aforementioned operations on a computer-readable recording medium, and to configure an input device 100 by installing this program on a computer to execute the aforementioned processing. Furthermore, it is permissible to store on a disk device provided in a server device on a network such as the Internet, and make it possible to download and the like to a computer, for example. Furthermore, it is permissible to implement the aforementioned functions by collaboration between an OS (operating system) and application software. In this case, it is permissible for only the portions other than the OS to be stored and distributed on a medium, and, furthermore, for those portions to be downloaded and the like to a computer.

As a recording medium that records the aforementioned program, it is possible to use a computer-readable recording medium such as a USB memory, flexible disk, CD, DVD, Blu-ray Disc (registered trademark), MO, SD card, Memory Stick (registered trademark), as well as a magnetic disk, optical disk, magneto-optical disk, semiconductor memory, or magnetic tape. Furthermore, it is possible to use a recording medium such as a hard disk or a SSD (solid state drive) or the like that is normally used fixedly in a system or device.

It is possible for the present invention to have various types of embodiments and modifications without departing from the broad spirit and scope of the present invention. Furthermore, the aforementioned embodiment is for describing the present invention, and does not restrict the scope of the present invention. In other words, the scope of the present invention is indicated not in the embodiment, but in Claims. Various types of modifications implemented within the claims and the meaning of the invention that is equivalent to the claims are deemed to be within the scope of the present invention.

It is possible for some or all of the aforementioned embodiment to be also described as in the following appendices without restriction thereto.

(Appendix 1)

An information processing device comprising:

an inputter that inputs a captured image of a subject captured by a camera;

an acquirer that acquires information indicating a distance between the camera and the subject;

a storer that stores reference data for specifying a state of the subject and input data corresponding to the state, for each distance between the camera and the subject;

a selector that selects, from among the reference data stored in the storer, reference data corresponding to the distance indicated by the information acquired by the acquirer; and a specifier that refers to the reference data selected by the selector, specifies the state of the subject in the captured image input by the inputter, and specifies data corresponding to the specified state.

(Appendix 2)

The information processing device according to Appendix 1, wherein the storer stores reference data for specifying a larger number of states as the distance between the camera and the subject becomes closer.

(Appendix 3)

The information processing device according to Appendix 1 or 2, wherein the storer stores reference data for specifying, as the state, a movement, shape, and inclination of a hand serving as the subject.

(Appendix 4)

The information processing device according to any one of Appendices 1 to 3, wherein the specifier extracts an image of the subject in the captured image input by the inputter, and specifies the state of the subject depicted by the extracted image of the subject, based on the reference data selected by the selector.

(Appendix 5)

The information processing device according to any one of Appendices 1 to 4, wherein the acquirer analyzes image data captured by the camera, and acquires the information indicating the distance between the camera and the subject.

(Appendix 6)

The information processing device according to any one of Appendices 1 to 5, further comprises a display that displays the captured image of the subject captured by the camera.

(Appendix 7)

The information processing device according to Appendix 6, wherein the display displays the state of the subject specified based on the reference data selected by the selector, and the input data corresponding to the state.

(Appendix 8)

An information processing method comprising:

a storing step for storing reference data for specifying a state of a subject captured by a camera and input data corresponding to the state, for each distance between the camera and the subject;

an inputting step for inputting a captured image of the subject captured by the camera;

an acquiring step for acquiring information indicating a distance between the camera and the subject;

a selecting step for selecting, from among the reference data stored in the storing step, reference data corresponding to the distance indicated by the information acquired in the acquiring step; and a specifying step for referring to the reference data selected in the selecting step, specifying the state of the subject in the captured image input in the inputting step, and specifying data corresponding to the specified state.

(Appendix 9)

A recording medium having a program recorded thereon to allow a computer to function as:

an inputter that inputs a captured image of a subject captured by a camera;

an acquirer that acquires information indicating a distance between the camera and the subject;

a storer that stores reference data for specifying a state of the subject and input data corresponding to the state, for each distance between the camera and the subject;

a selector that selects, from among the reference data stored in the storer, reference data corresponding to the distance indicated by the information acquired by the acquirer; and a specifier that refers to the reference data selected by the selector, specifies the state of the subject in the captured image input by the inputter, and specifies data corresponding to the specified state.

The present invention is based upon Japanese Patent Application No. 2011-101894 filed on Apr. 28, 2011. The entirety of the specification, scope of the patent claims, and drawings of Japanese Patent Application No. 2011-101894 is incorporated herein by reference.

INDUSTRIAL APPLICABILITY

The present invention is suitable for an information processing device, an information processing method, and a recording medium with which data is input by means of a user's gesture.

REFERENCE SIGNS LIST

1 Operator
2 Camera
3 Display
3W Gesture input support window
3i Window
4 Storer
5 Controller
41 Long-distance reference data storer
42 Middle-distance reference data storer
43 Short-distance reference data storer
51 Inputter 52 Acquirer
53 Selector
54 Specifier
55 Executer
100 Information processing device
200 Hand

What is claimed is:

1. An information processing device, comprising:
an inputter configured to input an image of a subject captured by a camera;
an acquirer configured to determine a distance between the camera and the subject based on the image;
a storer configured to store reference data for each of a plurality of distances between the camera and the subject, the reference data for each of the plurality of distances comprising state data for determining a state of the subject and input data corresponding to the state of the subject;
a selector configured to select the reference data for one of the plurality of distances corresponding to the distance determined by the acquirer;
a specifier configured to determine the state of the subject based on the selected reference data, and to read out input data corresponding to the state of the subject from the selected reference data; and
wherein the state of the subject comprises a gesture indicating a movement and a shape of a hand of the subject for each of the plurality of distances below a predetermined distance, and comprises a gesture indicating only a shape of the hand of the subject for each of the plurality of distances greater than a predetermined distance.

2. The information processing device of claim 1, wherein the state data specifies a larger number of states as the distance between the camera and the subject becomes smaller.

3. The information processing device of claim 1, wherein the state of the subject comprises at least one of a movement, shape, and inclination of a hand of the subject.

4. The information processing device of claim 1, wherein the specifier extracts a portion of the image corresponding to a hand of the subject and compares the extracted portion to the selected reference data to determine the state of the subject.

5. The information processing device of claim 1, wherein the acquirer is configured to determine the distance between the camera and the subject by determining a length between temples of a face of the subject in the image, a distance between eyes of the subject, a width of a back of a hand of the subject, a width of a wrist of the subject, or a combination thereof.

6. The information processing device of claim 1, further comprising a display configured to display the image of the subject captured by the camera.

7. The information processing device of claim 6, wherein the display is configured to display the determined state of the subject and the input data corresponding to the state of the subject.

8. The information processing device of claim 1, wherein the specifier is configured to analyze skin-color information in the image of the subject to extract a portion of the image corresponding to a hand of the subject.

9. The information processing device of claim 8, wherein the specifier is configured to compare the extracted portion of the image to the selected reference data to determine the state of the subject.

10. The information processing device of claim 1, comprising an executor configured to receive the input data from the specifier and to execute a command contained in the input data.

11. The information processing device of claim 10, wherein the command contained in the input data comprises movement of a cursor on a display.

12. An information processing method, comprising:
storing reference data for each of a plurality of distances between a camera and a subject, the reference data for each of the plurality of distances comprising state data for determining a state of the subject and input data corresponding to the state of the subject, wherein the state data comprises a gesture indicating a movement and a shape of a hand of the subject for each of the plurality of distances below a predetermined distance, and comprises a gesture indicating only a shape of the hand of the subject for each of the plurality of distances greater than a predetermined distance;
determining a distance between the camera and the subject based on an image of the subject captured by the camera;
selecting the reference data for one of the plurality of distances corresponding to the determined distance between the camera and the subject;
determining the state of the subject based on the selected reference data; and
reading out input data corresponding to the state of the subject from the selected reference data.

13. The information processing method of claim 12, wherein the state data specifies a larger number of states as the distance between the camera and the subject becomes smaller.

14. A tangible, non-transitory machine-readable storage media comprising stored executable instructions that, when executed by a computer, cause the computer to:
determine a distance between a camera and a subject based on an image of the subject captured by the camera;
store reference data for each of a plurality of distances between the camera and the subject, the reference data for each of the plurality of distances comprising state data for determining a state of the subject and input data corresponding to the state of the subject, wherein the state data comprises a gesture indicating a movement and a shape of a hand of the subject for each of the plurality of distances below a predetermined distance, and comprises a gesture indicating only a shape of the hand of the subject for each of the plurality of distances greater than a predetermined distance;
select the reference data for one of the plurality of distances corresponding to the determined distance between the camera and the subject;
determine the state of the subject based on the selected reference data; and
read out input data corresponding to the state of the subject from the selected reference data.

15. An information processing device, comprising:
a storer configured to store reference data for each of a plurality of distances between a camera and a subject, the reference data for each of the plurality of distances comprising state data for determining a state of the subject and input data corresponding to the state of the subject, wherein the state of the subject comprises a gesture indicating a movement and a shape of a hand of the subject for each of the plurality of distances below a predetermined distance, and comprises a gesture indicating only a shape of the hand of the subject for each of the plurality of distances greater than a predetermined distance;
a selector configured to select the reference data for one of the plurality of distances corresponding to a determined distance between the camera and the subject; and a specifier configured to determine the state of the subject based on the selected reference data, and to read out input data corresponding to the state of the subject from the selected reference data.

16. The information processing device of claim 15, comprising analyzing skin-color information in an image of the subject acquired by the camera to extract a portion of the image corresponding to a hand of the subject.

17. The information processing device of claim 16, comprising comparing the extracted portion of the image to the selected reference data to determine the state of the subject.

18. The information processing device of claim 15, comprising an executor configured to execute a command contained in the input data.

* * * * *